Figure 1A:
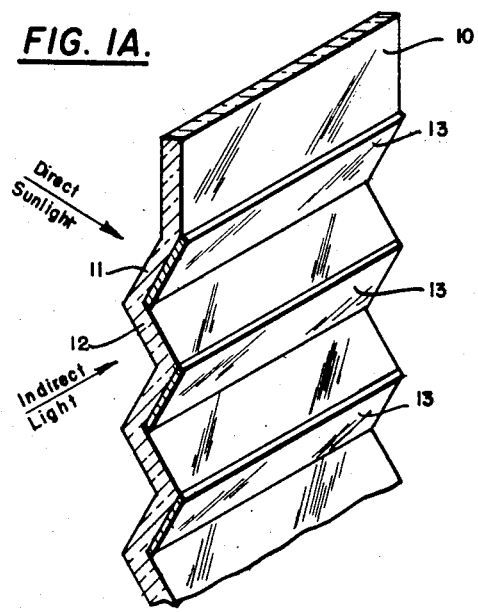

Feb. 24, 1959  S. N. F. LUBOSHEZ  2,874,611
COMBINED HEAT REFLECTOR AND LIGHT TRANSMITTER STRUCTURE
Filed Aug. 13, 1954

INVENTOR
S. N. F. LUBOSHEZ

BY *Marie G. Hall*

ATTORNEYS

United States Patent Office 2,874,611
Patented Feb. 24, 1959

2,874,611

COMBINED HEAT REFLECTOR AND LIGHT TRANSMITTER STRUCTURE

Sergius N. Ferris Luboshez, Bethesda, Md.

Application August 13, 1954, Serial No. 449,615

8 Claims. (Cl. 88—60)

The present invention relates to devices providing selective shielding effects for light and/or heat radiations, and is more particularly concerned with such devices which may be utilized in homes, building structures or in vehicles, and which serves to provide such shielding.

Reference is made to my copending application Serial No. 328,270, filed December 29, 1952, now abandoned, for: "Thermal Insulator," of which the instant case is a continuation-in-part, wherein the problems involved in providing a radiation or thermal shield have been discussed at some length. As was pointed out in my said prior copending application, solar radiation is often an important factor in determining the efficiency with which an air conditioning unit may operate in a building structure or in a vehicle. Thus, it has been found that when air conditioning is employed in an office building, for instance, the cooling load imposed by incident solar radiation alone may amount to as much as 75% of the total load. Clearly, therefore, it is of considerable importance to exclude solar radiation in order to render an air cooling unit more efficient within a building structure. This is, of course, the case under summertime conditions. In meeting these requirements, I have disclosed in my said copending application a thermal insulator construction comprising a corrugated shield of plastic material, said shield being coated along selected portions of the said corrugations with a radiation reflective material. This construction, which will be discussed in somewhat greater detail hereinafter, lends itself readily to the formation of a blind-like structure and permits indirect light to enter the room of a building structure while at the same time excluding, by reflection, direct solar radiation.

Under wintertime conditions, however, a directly opposite desideratum is present, namely, that solar radiation be permitted to enter a room while at the same time heat within the room is prevented from radiating to the outside. The present invention represents an improvement of the structure set forth in my copending prior application, identified previously, and permits this latter wintertime function to be performed selectively in conjunction with the former summertime function, and at the same time, provides a structure insuring complete privacy as well as the radiation shielding properties mentioned previously.

It is accordingly an object of the present invention to provide an improved radiation shield which may be readily utilized in conjunction with a window or other radiation translucent structure of a building or vehicle.

A further object of the present invention resides in the provision of an improved shielding structure in the nature of a shutter or blind which will selectively admit light while excluding direct solar radiation from a building or vehicle.

Still another object of the present invention resides in the provision of an improved shielding structure which may be adjusted to selectively admit direct solar radiation while preventing radiation of heat from the interior of a building or vehicle to the outside thereof.

Still another object of the present invention resides in the provision of an improved radiation shield which may be utilized in conjunction with a window, for instance, and which may selectively provide a complete block to all light and heat radiation passing into or out of a structure having the said window therein.

A still further object of the present invention resides in the provision of an improved radiation shielding structure which is light weight in construction and which may be readily and inexpensively manufactured.

A further object of the present invention resides in the provision of a combination blind and selective radiation shielding structure which may be incorporated in a windowpane, a panel or as a wall construction member.

In accordance with the foregoing objects, the present invention employs a pair of corrugated sheet-like members each of which has predetermined portions of their said corrugations coated with a radiation reflective material. The said radiation reflective material is so arranged with respect to one of said sheets that when utilized alone the said sheet serves to exclude direct solar radiation while permitting the ingress of indirect or diffused light to a room. The other of said sheets, in turn, has its reflective portions so disposed thereon that it in turn serves, when utilized alone, to permit the ingress of direct solar radiation while preventing, by reflection, the egress of internal heat radiation from a room or vehicle. Each of the said sheets has its reflective portions so arranged with respect to the reflective portions of the other of said sheets that, when utilized together, the combined sheets provide a complete radiation barrier to both the ingress and egress of heat and light, and thus insure not only complete thermal insulation but, in addition, complete privacy.

Figure 1B:
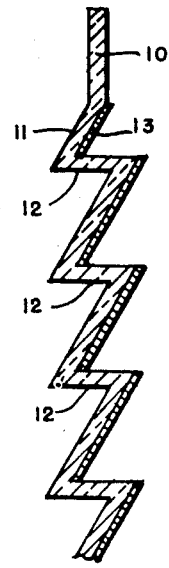
Figure 2:
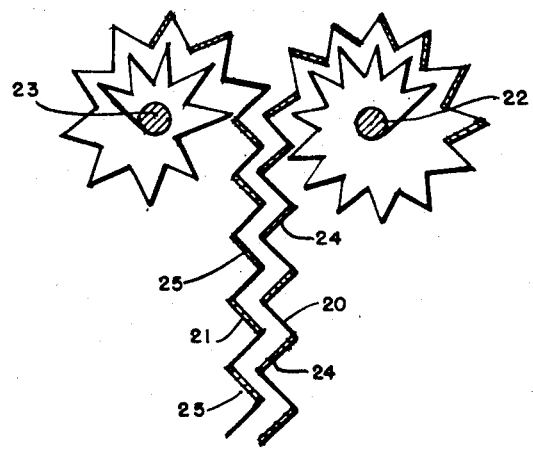

The foregoing objects, advantages and construction of my improved radiation shield will be more readily seen from the following description and accompanying drawings, in which:

Figure 1A is a diagrammatic representation of a portion of one sheet of my radiation shield, Figure 1B is a cross sectional view of a modified form of one sheet of my radiation shield in accordance with the present invention, and Figure 2 represents a composite shield in accordance with the present invention providing selective shielding effects to the ingress and/or egress of heat and light.

Referring now to Figure 1A of the drawings, it will be seen that, as has been discussed in my prior copending application, a basic form of my shielding structure comprises an elongated sheet structure 10, preferably of a suitable pliable or flexible material such as cellulose acetate or other transparent sheet, is cut to a suitable size to fit a desired window when installed. Sheet 10 defines a plurality of corrugations, as is shown in Figure 1A, and while the sheet 10 is light-weight in construction and, in fact, is normally only 3 to 10 mils in thickness, the bending of the said corrugations into the sheet 10 imparts considerable structural rigidity to the overall sheet structure thereby permitting the corrugated sheet to maintain the desired dimensions and shape originally given it.

Each of the corrugations in sheet 10 comprises a first surface 11 contiguous with a further surface 12 and disposed at a predetermined angle thereto. The several corrugations may be formed in the sheet material by an appropriate bending and/or heat treating operation, and the said corrugations will be maintained in the material thereafter because of the internal stiffness of the said material. In practice, the said corrugations may be of any desired and appropriate dimension, but in a preferred embodiment of my invention the said corrugations are between two inches and $\frac{1}{32}$ of an inch from crest to crest.

The upper angularly disposed surfaces 11 of the corrugations have a reflective coating 13 thereon which coating may take the form of an aluminum foil strip, and when such construction is in fact employed the faces 11 of the cellulose sheet 10 may have a heat-sealing or other adhesive coating to which the narrow reflective strips 13 are adhered or attached. If desired, the reflective strips 13 may be placed on either the exterior or the interior of the corrugations, and further, the said reflective portions 13 may be rolled on or may be applied as a foil, a paint, or a powder of reflective material. In this respect it should further be noted that other materials such as silver, chromium, etc. may be employed to effect the desired reflective characteristics. The under surface 12 of each of the corrugations is left clear or translucent so as to permit the admission of indirect light therethrough and, if desired, the sheet 10 may be perforated at predetermined portions thereof to admit air.

As may be seen from an examination of Figure 1A, direct sunlight directed toward the said sheet 10 is prevented from entering a room utilizing the said structure because of reflection from the portions 13 adhering to the upper faces 11 of the several corrugations. Indirect light, however, may readily pass through the clear faces 12 of the corrugations, and thus the structure shown in Figure 1 serves to shield a room from direct solar radiation while at the same time permitting indirect light to enter the room.

In practice, the angle between the faces 11 and 12 may be of any desired magnitude and the said angle will in fact vary depending upon the latitude at which the assembly is employed as well as upon the time of year. In practice the corrugations are maintained permanently within the sheet 10 once formed there and, therefore, the angle described between the faces of the said corrugations is normally preselected in accordance with the particular use to be made of the shield. However, it is also contemplated that means such as pliant cords may be attached between opposing faces of the said corrugations thereby to permit ready control of the said angle between the faces of the corrugations. This structure will therefore permit adjustment of the reflective surface to a proper angle with respect to the incident solar radiation. Such adjusting means have in fact been discussed and shown in my copending application Serial No. 328,-270, identified previously.

It will be noted that the precise structure of Figure 1A, when utilized alone, permits something less than complete privacy inasmuch as when drawn across a window, an observer may still look through a part of the transparent surfaces 12 of the corrugated shielding structure. This privacy consideration may be met completely by so constructing the shielding structure that the corrugation faces 12 lie respectively in horizontal planes, the faces 11 and the reflective coatings 13 thereon still being at substantially the same angle previously employed. Such an arrangement is shown in Figure 1B. When this construction is employed, the overall structure will operate as before to exclude direct solar radiation while permitting ingress of indirect light; but will, in addition, permit complete privacy to a room employing the said structure as a blind and radiation shield.

The device shown in Figures 1A and 1B has, as been mentioned previously, been discussed in detail in my copending application. While it operates very efficiently, it sould be noted that its true scope of operation is somewhat limited by the structural disposition of the reflective coatings 13, and in fact the single sheet structure shown in Figures 1A and 1B is of prime utility only when it is desired to exclude direct solar radiation. This situation, of course, prevails only under summertime conditions. As will be readily apparent upon consideration, a directly opposite situation is present under wintertime conditions, and in this latter case, it is ordinarily desired to permit full ingress of solar radiation.

The form of my invention shown in Figure 2 greatly extends the range of utilization of a radiation shield in accordance with the present invention. Referring to the said Figure 2, it will be seen that I provide two sheet-like structures 20 and 21 which are individually of essentially the same construction as has been discussed in reference to Figures 1A and 1B. The said elongated sheets 20 and 21, being each of flexible construction, may be carried respectively upon rollers 22 and 23 which may be disposed side by side, as has been shown in Figure 2, or which may, if desired, be placed one above the other. It should be noted that, when rolled upon rollers 22 and 23, the corrugations in sheets 20 and 21, respectively, nest one within the other in the several superposed layers of each roll. The corrugated structure thus forms a roll quite readily. In addition, it should be noted that, as shown, the external peripheries of the two rolls mesh one within the other, thus assuring complete correspondence between the two sheets as they are unrolled. The said corrugated configurations thus form their own cog-wheels upon rolling, thereby facilitating the raising and lowering of the sheets in accordance with the present invention.

The sheet 20 is again formed with a series of corrugations defining upper and lower faces at a predetermined angle to one another; and the said upper faces of the corrugations on sheet 20 are in turn coated with a reflective material 24 in accordance with the considerations set forth in respect to Figures 1A and 1B. Sheet 21 is formed with a further series of corrugations, again defining upper and lower faces at a predetermined angle to one another, and the lower faces of the said corrugations in sheet 21 are coated with further reflective material 25. To facilitate representation of the composite shutter, Figure 2 has utilized a single-line representation for the rolled sheets and, further, has shown only some of the reflective surfaces. As will be seen, therefore, the reflective coatings 24 and 25 are essentially complementary to one another and when both sheets 20 and 21 are completely drawn across a window or other radiation translucent structure, the combined structure of sheets 20 and 21 serve to block completely the ingress of direct sunlight as well as of indirect light, and further serves to block the egress of heat radiation from the interior of a room. The structure thus provides a complete radiation shield or insulator and further acts to insure privacy whereby, when utilized together, the said sheets 20 and 21 perform much the same function as a conventional blind while providing the additional feature of radiation shielding.

Under summertime conditions, the sheet 20 may be utilized alone and the operation under such circumstance is as has been discussed in reference to Figures 1A and 1B, whereby direct solar radiation is excluded from a room by reflection from portions 24, while indirect light may pass into the room through the clear portions defining the under surface of the corrugations therein. Under wintertime conditions, on the other hand, the elongated sheet 21 may be utilized alone and when so utilized, direct sunlight is permitted to pass into a room through clear portions 26 defining the upper faces of the corrugations in sheet 21, while heat is retained within the said room to a considerable extent by reflection from the portions 25 coating the under faces of the corrugations of sheet 21. Thus, the shield structure shown in Figure 2 may be utilized under four conditions of operation, namely:

(a) With both sheets or screens 20 and 21 down, no light or radiant heat may pass in either direction through the composite shield;

(b) With both sheets 20 and 21 up, light and/or heat radiation is permitted to pass freely into and out of the room;

(c) With sheet 20 down and sheet 21 up, direct solar radiation is excluded from the room but indirect light is permitted to pass into the room; and (d) With sheet 21 down and sheet 20 up, direct solar radiation may pass into the room while thermal radiation from the interior of the room is prevented from passing to the outside of the said room.

The structure thus permits complete privacy at any time of the night or day; acts to cool the room without darkening the said room under summertime use; and in effect acts as an improved storm window structure under wintertime conditions. The structure also permits for a clear unobstructed view at any time if such should be desired, and in fact when both screens 20 and 21 are pulled up or down simultaneously, the device acts much as an ordinary or conventional shade or blind with the additional feature of providing radiation shielding as well as light obstruction.

In order to facilitate use of the two rolled and corrugated sheets 20 and 21, together or singly, the rolls 22 and 23 may include spring members (not shown) normally urging the corrugated rolls into meshing contact with one another. Either of the rolls may further cooperate with latching means whereby the said rolls may be selectively separated and latched out of meshing contact, so that either roll may be used alone. Many such expedients will suggest themselves to those skilled in the art. Further, guide channels are preferably provided adjacent the elongated vertical edges of the rolls, when they are mounted as a blind or shutter, to limit permissible movement of the sheets 20 and 21 to essentially a single dimension.

While I have described a preferred embodiment of my invention, it is to be understood that the foregoing is meant to be illustrative only and is not limitative of my invention, and it is intended that the true scope of my invention is as set forth in the appended claims.

Having thus described my invention, I claim:

1. A combined heat reflector and light transmitter structure for simultaneously excluding heat rays and for admitting light from a source of mixed radiation comprising a pair of corrugated sheets of resilient, light-transmitting material in generally parallel and closely spaced relation to one another, each sheet having metallic heat-reflecting material on one side only of each corrugation leading to its crest, the other side of each corrugation leading to its crest being light-transmitting, the metallic heat-reflecting material being on the same side of each corrugation leading to its crest, whereby the corrugated sheet forms alternating light-transmitting and heat-reflective bands, at least one side of the metallic material applied to the corrugations being exposed directly to the surrounding atmosphere, the heat-reflective bands extending at an angle to the general plane of the sheet which is sufficiently different from a right angle that heat rays striking said metallic surfaces at a predetermined range of angles from a source above a horizontal plane passing through said surfaces will be reflected away from said surfaces and to the side thereof from which the rays originated, while the alternating light-transmitting bands will transmit light through the sheet, and means mounting said sheets for selective movement relative to one another.

2. A combined heat reflector and light transmitter structure as set forth in claim 1, in which the metallic heat-reflective material applied to the portions of the respective corrugations are at the same side of the sheet.

3. A combined heat reflector and light transmitter structure as set forth in claim 1, in which the sheet is elongated and the corrugations extend transversely to the direction of elongation of the sheet.

4. A combined heat reflector and light transmitter structure as set forth in claim 1, in which the sheet is flexible material.

5. A combined heat reflector and light transmitter structure as set forth in claim 1, in which the metallic heat-reflective material extends from the respective valleys to the respective crests of the corrugations.

6. A combined heat reflector and light transmitter structure as set forth in claim 1, in which the corrugations have straight sides.

7. A combined heat reflector and light transmitter structure as set forth in claim 1, in which the corrugations of the portions of the sheets opposite one another are partially nested.

8. A combined heat reflector and light transmitter structure as set forth in claim 1, in which the upper ends of said sheets are secured to rollers about which they are adapted to be wound.

References Cited in the file of this patent

UNITED STATES PATENTS

| | | |
|---|---|---|
| 721,258 | Wadsworth | Feb. 24, 1903 |
| 1,937,342 | Higbie | Nov. 28, 1933 |
| 2,205,523 | Galey | June 25, 1940 |
| 2,280,358 | Tietig | Apr. 21, 1942 |